Dec. 15, 1959   R. C. LEGAT   2,916,786
BUCKLE
Filed March 9, 1956   2 Sheets-Sheet 1
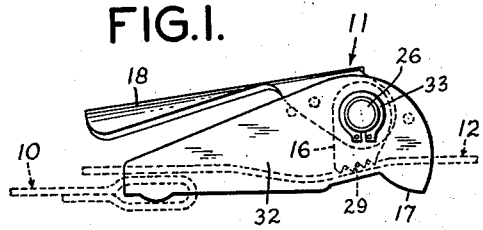
FIG.1.
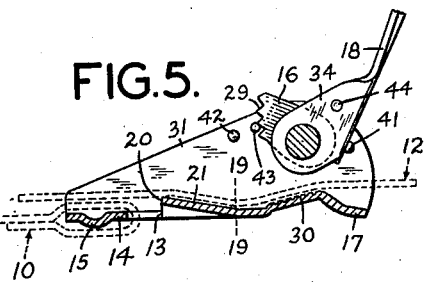
FIG.5.
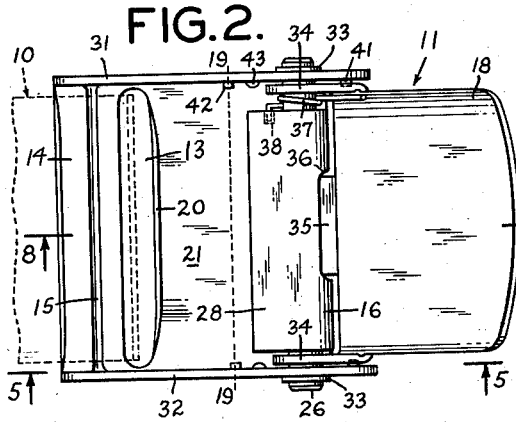
FIG.2.
FIG.3.
FIG.4.
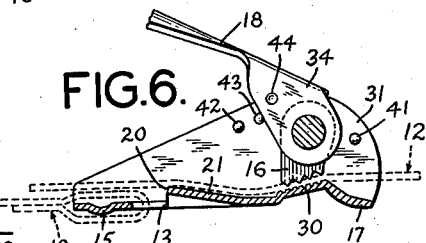
FIG.6.
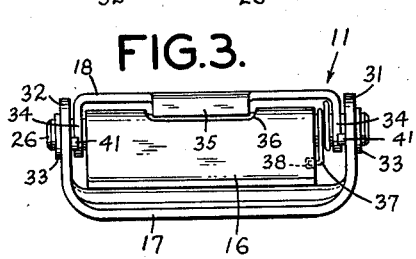
FIG.17.
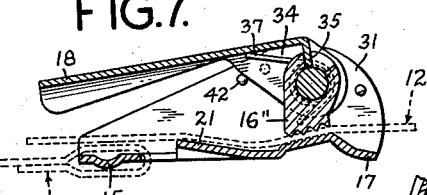
FIG.7.
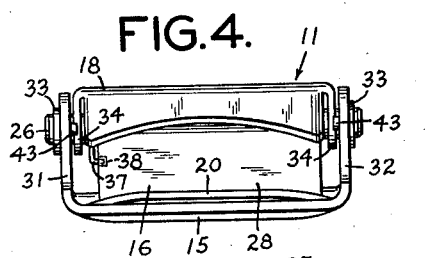
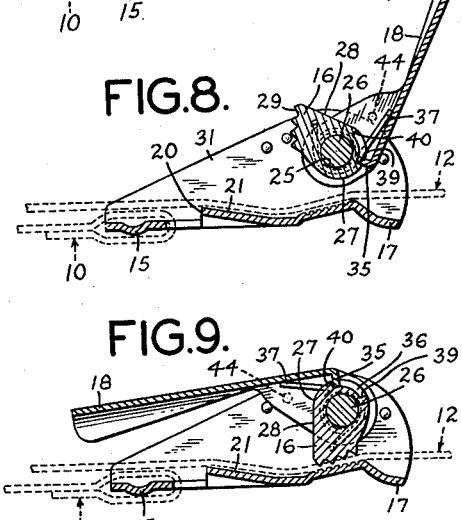
FIG.8.
FIG.9.
INVENTOR
ROBERT C. LEGAT
BY
ATTORNEYS Dec. 15, 1959 R. C. LEGAT 2,916,786
BUCKLE
Filed March 9, 1956 2 Sheets-Sheet 2
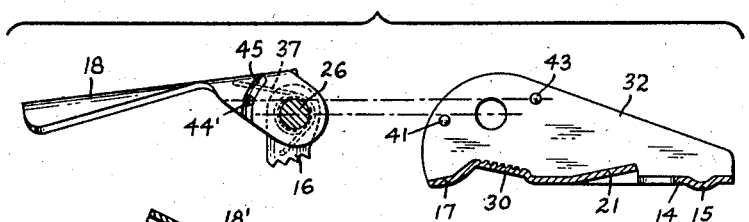
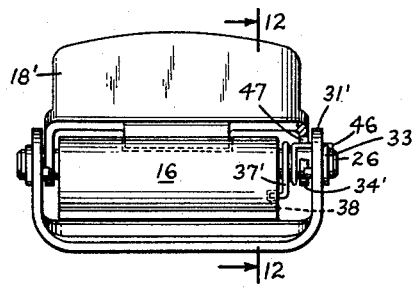
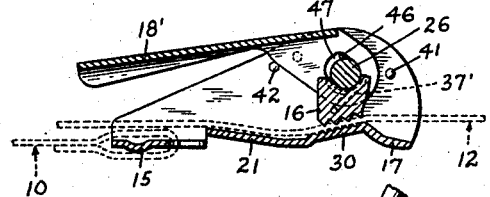
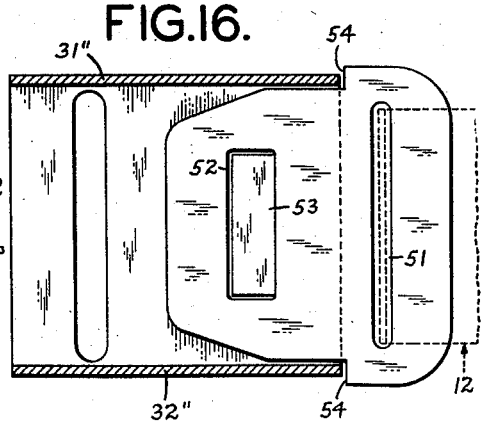
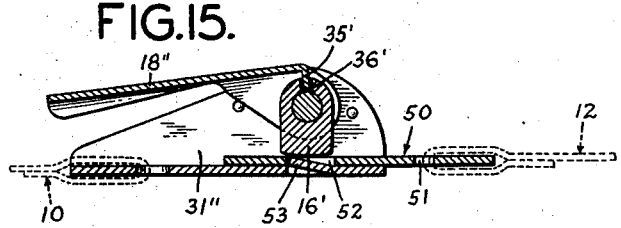
INVENTOR
ROBERT C. LEGAT
BY
ATTORNEYS

United States Patent Office 2,916,786
Patented Dec. 15, 1959

2,916,786
BUCKLE

Robert C. Legat, New Britain, Conn., assignor to The G. E. Prentice Manufacturing Company, Kensington, Conn., a corporation of Connecticut Application March 9, 1956, Serial No. 570,511

3 Claims. (Cl. 24—170)

This invention relates to buckles, and more particularly to buckles for use on safety belts in automobiles and aircraft.

Safety belts to hold operators or passengers from being hurtled from their seats into vehicle parts or out of the vehicles are becoming increasingly important because of the substantially higher speeds at which automobiles and aircraft are operated and because of the substantially increased number of such vehicles in operation. One of the most important links in a safety belt is the buckle therefor. The buckle of such a belt should be constructed so that it can easily and readily be connected to the belt and released therefrom, and when in connected condition be able to withstand very high pressure without danger of slipping on the belt or opening up.

It is the primary purpose of the instant invention to provide an improved safety belt buckle having a structure which is capable of satisfying the aforesaid requirements.

A further object of the invention is to provide a buckle of the indicated type which when connected on the belt will always be in a locked condition until positively unlocked and yet while in such locked condition shall permit the adjustment of the belt to be tightened.

Other advantages and the novel features of the invention shall become apparent after a perusal of the following description when read in connection with the accompanying drawings, in which Fig. 1 is a side elevational view of a buckle made in accordance with the invention and shown in closed condition;

Fig. 2 is a top plan view of the buckle with the lever thereof shown in opened position;

Fig. 3 is an end view of the buckle, looking toward the outer end of the buckle or toward the right hand end of Fig. 1;

Fig. 4 is a view of the inner end of the buckle shown in Fig. 1;

Fig. 5 is a sectional view taken along the line 5—5 of Fig. 2;

Fig. 6 is a sectional view similar to Fig. 5, but showing the hand lever partly advanced to the closed position in which the locking cam is engaging the inserted belt end;

Fig. 7 is a sectional view similar to Figs. 5 and 6, but showing a modified form of locking cam and the lever in fully closed position as in Fig. 1;

Figs. 8 and 9 are sectional views taken along the line 8—8 of Fig. 2 and showing the relation of the connected end of the lever to the gripping cam in the positions shown in Figs. 5 and 7, respectively;

Fig. 10 is an exploded view showing a modified construction of the lever locking means; the lever and an associated buckle wall being shown in folded out relation;

Fig. 11 is an outer end view of another embodiment of the invention;

Fig. 12 is a sectional view taken along the lines 12—12 of Fig. 11;

Fig. 13 is a sectional view similar to Fig. 12 but showing the lever moved to closed position;

Fig. 14 is a longitudinal sectional view of a further embodiment of the invention; the lever in this view being shown in retracted or open position;

Fig. 15 is a view similar to Fig. 14, but showing the lever in advanced or closed position;

Fig. 16 is a sectional view taken along the line 16—16 of Fig. 14; and

Fig. 17 is a perspective view of the locking cam of the buckle shown in Figs. 1 to 6.

Referring now more particularly to Figs. 1 to 9 of the drawings, the numeral 10 designates generally the belt part which connects the buckle 11 to the seat of the vehicle, while the numeral 12 designates generally the belt part which is to be secured by the buckle 11. The belt part 10 may be permanently connected at one end to one side of the vehicle seat and is provided at its other end with a loop that extends through an elongated opening 13 provided in the inner end of the body of the buckle. The belt part 12 may be permanently connected at one end to the other side of the vehicle seat and its other free end is inserted into the outer end of the buckle between the body thereof and a cam 16. The belt parts may be made of webbing or other suitable material of satisfactory strength and durability, and the free terminus of belt part 12 may be metal tipped.

The buckle body is made of very heavy steel sheet stock and is heat treated to increase its strength. The strength of the bar 14 formed on the inner end of the back plate of the body by the opening 13 and extending through the looped end of the belt part 10, is enhanced by a transverse rib 15 formed in such bar 14 and extending longitudinally and substantially centrally thereof. It will be noted from Fig. 5 of the drawings, that the other or outer end of the buckle body is flared outwardly to provide a transverse guide lip 17. The configurations of the cam 16 and the lower end of the lever 18 are such that when the lever 18 is in a raised position as shown in Fig. 5, the cam 16, lever 18 and lip 17 form a mouth into which may be readily inserted the outer or free end of the belt part 12 without requiring the visual observation of the user and which automatically guide such free end between and past the cam 16 and the buckle body. The buckle body from a line located approximately at the position indicated by the line 19—19 in Figs. 2 and 5 of the drawings, to the outer edge 20 of the opening 13 is inclined inwardly to provide a sloping guideway or ramp 21 which guides the free end of the belt part 12 from the opening under the cam 16 over the looped end of the belt part 10. The outer edge 20 of the opening 13 is formed or distorted so that the central portion thereof is spaced from the straight inner edge of such opening, in a transverse direction, a distance greater than the thickness of the plate material of which the buckle is formed and such that the free end of belt part 12 may pass over the looped end of belt part 10 without danger of catching or stubbing. As a result of the configuration and coaction of cam 16, lever 18, lip 17 and the ramp 21, the free end of the belt part 12 may be readily threaded through the opening under the cam 16 and through the buckle without the user looking to see if such operation is being properly performed and without fumbling or worrying as to the possibility of such free belt end catching so that the operation is quickly accomplished.

The cam 16 is made of cast, tinned bronze and is provided with a longitudinally extending, offset bore or opening 25 through which extends a shaft or pin 26. The bore 25 has a greater cross sectional area than the pin 26 so that the cam is readily rotated on the pin. The peripheral surface of cam 16 includes a portion 27 which is substantially concentric with the cylindrical surface of bore 25 for approximately 180°, a portion 28 which is substantially tangentially disposed to portion 27 at the upper end of the latter and extends inwardly of the buckle therefrom a distance approximately equal to the distance between the axis of pin 26 and the body portion of the buckle, and a serrated or toothed portion 29 which extends from the inner free end of surface portion 28 to the lower end of surface portion 27. The ends of the teeth in portion 29 are contained in a common plane and such portion may include four or more teeth. The teeth on portion 29 coact with a transverse ribbed or grooved portion 30 provided on the buckle body beneath the cam 16 and located between the lip 17 and the ramp 21 of such body, to positively lock the buckle on the webbing or belt part 12. It will be noted that the body portion 30 is bent into the form of a flat rib which substantially increases the strength of the body in this region so that the buckle will hold the locked web under very severe suddenly applied stresses.

The pin 26 is rotatably supported on sides or ears 31, 32 formed integrally with the longitudinal edges of the back plate of the body member and extending outwardly from such member. Besides serving as bearings for the pin 26, the sides 31, 32 impart to the body member a U-shape which substantially increases its resistance to distortion under sudden high stresses and assures that the cam 16 will retain its hold on the belt part during the application of such stresses. The ends of the pin 26 projecting beyond the sides 31, 32 are provided with annular grooves located adjacent to the outer surfaces of such sides and having seated therein split rings 33 which lock the pin in position on the side walls, yet make it possible to readily remove the pin and thereby disassemble the buckle. The lever 18 is also rotatably mounted on pin 26 through a pair of ears 34 which are located between the ends of the cam 16 and the side walls 31, 32 of the buckle body and which are provided with aligned openings through which the pin extends. The central inner end of the lever 18 is provided with a lug 35 disposed at substantially right angles to the body of the lever and preferably extending into an elongated recess 36 provided in the wall of the cam 18 in the region of portion 27 thereof. The end of lug 35 rides on the inner or bottom wall of recess 36. As shown more clearly in Figs. 8 and 9 of the drawings, the width of recess 36 is substantially greater than the thickness of lug 35 so that lever 18 may be rotated on pin 26 relative to cam 16 through a distance of approximately 20 degrees. It has been found that a recess 36 having a length of approximately 7/8 of an inch, a width of approximately 5/16 of an inch, and a depth of approximately 1/4 of an inch, will be satisfactory for the purposes of the invention. The recess or opening 36 may also extend through to the bore 25 so that the lug 35 rides on the exposed peripheral portion of pin 26. This construction is shown in Fig. 7 of the drawings, the so modified cam member being designated 16".

The lever 18 may be normally maintained in spread condition relative to the cam 16 by a spring 37 coiled about one end of pin 26 between a lever ear 34 and the cam 16. One leg of spring 37 is seated on the inner surface of lever 18 adjacent to the juncture of associated ear 34 with the body of such lever. The other leg of spring 37 is seated in a recess 38 provided on the adjacent end wall of cam 16. In the spread condition of cam 16 and lever 18 under the action of spring 37, lever lug 35 will be yieldingly maintained in engagement with side edge 39 of opening 36 (note Fig. 8) and the cam and lever will rotate as a unit about pin 26 until the toothed portion 29 of cam 16 comes into engagement with either the grooved body portion 30 or a belt part 12 overlying such portion 30. In either case, the movement of cam 16 in a counterclockwise direction, as viewed in Figure 8, will be substantially ended, but lever 18 can continue in such rotative movement. As lever 18 continues such movement, the cam 16 which is in a locked position, will be more firmly secured in such locked position by the increasing tension exerted by spring 37 thereon due to such movement of lever 18. During such continued movement of lever 18 also, the lug 35 will move away from edge 39 of opening 36 and toward edge 40 of such opening. Because lug 35 will not reach edge 40 before lever 18 reaches the end of its rotative movement in this direction, as will hereinafter become more clear, the cam 16 will always be maintained in locked condition under yieldable pressure. This condition makes it possible for the user to tighten up the adjustment of the belt by pulling on the free end of belt part 12 and at the same time maintaining such belt part under the locked control of the buckle. In other words, the cam 16, under the condition stated, will yield when force is applied to the belt part 12 tending to draw it to the left as viewed in Fig. 1, to enable the adjustment of the belt to be tightened. When however, such force is released, or an opposite force is applied to the belt part 12 tending to separate it from the buckle, the cam 16 will immediately coact with the ribbed buckle portion 30 to lock the buckle to such belt part. The greater the applied force tending to withdraw the belt part 12 from the buckle, the greater will be the locking action applied by cam 16 and buckle portion 30 to such belt part. When the cam 16 yields under a force applied to the belt part 12 tending to tighten its adjustment, the cam 16 rotates in a clockwise manner on pin 26 so that edge 40 of opening 36 moves toward the stationary lug 35. This distance through which edge 40 may be moved relative to lug 35 under the stated condition is predetermined to enable the buckle to be used satisfactorily with the various weights of webbing or other belt part material available for safety belts.

The movement of the lever 18 in the opening direction may be limited by a pair of inwardly extending projections 41 formed on the outer ends of the buckle side walls 31, 32 and adapted to engage with the lever substantially at the lower ends of the lines of juncture of the body thereof with its ears 34 (note Fig. 5) to prevent any further movement of the lever in such direction. On the other side of the pin 26 the buckle side walls 31, 32 may be provided with a pair of inwardly extending projections 42 which come into engagement with the edges of ears 34 adjacent to the upper ends of the lines of juncture thereof with the lever body (note Fig. 7), to limit the movement of the lever 18 in the closing direction. It will be understood from the previous discussion that if projections 42 are included in the buckle, the portions thereof are predetermined to limit the closing movement of lever 18 to a point at which the lever lug 35 will be spaced from edge 40 of opening 36 a distance sufficient to permit of the adjustment described. The lever 18 is releasably locked in this position by a pair of inwardly extending projections 43 provided on the buckle side walls 31, 32 and engageable with a pair of recesses 44 provided in the outer surfaces of the lever ears 34. The configurations of projections 43 and recesses 44 are such that they are in the nature of friction catches which when engaged will maintain the lever 18 in its fully closed position to prevent accidental release of the locking action by the cam and until positively moved from such position by the user. At the same time, the latching action of the projections 43 and 44 may be readily released by the user exerting pressure on the lever tending to open it.

From the foregoing description, it is believed to be apparent that when the lever 18 is in a raised or opened position, as shown in Figs. 5 and 8 of the drawings, the belt part 12 may be readily threaded into the opening between the cam 16 and buckle portion 30 and through the buckle without difficulty or danger of catching. When the belt part 12 is inserted into the buckle, the lever 18 is moved to a closed position. In the initial part of such movement of the lever, i.e. from the position shown in Figs. 5 and 8 to the position shown in Fig. 6, the cam 16 moves therewith as a unit so that when the lever reaches the position shown in Fig. 6 of the drawings, the cam 16 has moved to a locking position on the belt part 12. At this position of the cam its forward movement is stopped, but it will be pressed into securer locking position on the belt part 12 by the increasing spring pressure exerted thereon by the lever 18 and spring 37 as the former moves from the position shown in Fig. 6 to the position shown in Figs. 7 and 9. Tests have shown that the buckle will retain its gripping action on the belt part 12 at pressures tending to cause slippage of the latter in the buckle substantially greater than 4000 pounds and will satisfactorily operate to release such belt part after being subjected to such a pressure by a relatively light pull on the lever. During the said secondary portion of the movement of lever 18 the lug 35 will move in the cam opening 36 from the position shown in Fig. 8 towards the position shown in Fig. 9. The position the lug 35 ultimately reaches in the opening 36 depends upon the thickness of the webbing in the belt part 12. Although the cam 16 may be in its fully locked position and the lever 18 advanced to its full closing position at which it is locked or latched, as has been explained, a further tightening of the adjustment of the belt part 12 can still be made without the necessity of any further operation of the buckle parts and without any danger of the release of the locking action of the buckle on the belt part 12 in the event of an accident while such adjustment is being made. The belt part 12 is released by simply applying pressure to the lever 18 to flip it up to the opened position, the cam 16 almost immediately releasing its gripping action on such belt part upon disengagement of the latch parts 43, 44. In order to prevent accidental opening of the lever 18, as by the sleeve cuff of the user catching the outer end thereof, the lever is given the special configuration illustrated in the drawings, namely, turned down outer end corners and a raised central portion. The corners coact with the side walls 31, 32 to prevent the end of the lever being inadvertently caught by the users sleeves, or other objects.

While I have hereinabove described and illustrated in Figs. 1 to 9 a preferred form of my invention, it will be evident to those skilled in the art that various changes and modifications may be made therein without departing from the spirit of the invention or the scope of the appended claims. For example it will be apparent that the spring 37 and seat 38 therefor may be eliminated, in which case the lug 35 on lever 18 may coact with the edge 40 of opening 36 in cam 16 to positively move the toothed portion 29 of such cam into locking relation on the belt end 12.

By eliminating the stop projections 42 and changing the shape of the locking recesses 44, it is possible to enable the lever to set the cam 16 in its locking position on the webbing 12 and not depend on the spring to accomplish this. In such a construction, as shown in Fig. 10 of the drawings, the recesses 44' with which the projections 43 latch, are in communication with following grooves 45 which are adapted to receive the projections 43 and thereby permit the lever 18 to be moved further in the closing direction. It will thus be seen that when the lever is moved from open position to the position shown in Fig. 6 of the drawings, wherein the cam 16 comes into engagement with the webbing 12, the lever can be moved further past the position shown in Fig. 7. During this further movement of the lever, the projections 43 will move into the grooves 45 and the lever lug 35 will engage with edge 40 of opening 36 to positively force the teeth of the cam 16 into the material of webbing 12. When pressure on the lever is removed, the lever is enabled to open under the tension of springs 37, the projections 43 withdrawing from grooves 45 and coming into latching engagement with the recesses 44'. Thus, the projections 43, recesses 44' and grooves 45 permit the lever 18 to open to a position at which the user may readily grasp the same to unlock the buckle, without unlocking the cam, which remains locked until the user wants to take off the belt by further moving lever 18 initially to unlatch the projections 43 and recesses 44' and then unlock the cam.

It may also be desirable to construct the buckle so that the cam will automatically move into holding engagement with the belt end 12 without the necessity of the user manually moving the lever 18 to closed position. As shown in Figs. 11 to 13 of the drawings, this is accomplished in part by anchoring one end of the spring 37' in a recess 38 in the cam 16 in the manner previously explained, and by anchoring the other end 46 of such spring in a recess provided at the top of and communicating with the bearing opening provided in the side wall 31' of the buckle for the shaft or pin 26. The recess for the spring end 46 has a depth substantially the same as the diameter of such spring end so that end 46 forms part of the wall of the bearing opening. End 46 extends between the spaced ends of the adjacent split ring 33. As shown more clearly in Figs. 12 and 13 in which the cam 16 and spring 37' are partially broken away, the opening 47 in the adjacent ear 34' of lever 18' through which pin 26 extends, is given a configuration to enable the spring end 46 to extend therethrough into its recess seat without interfering with the movements of the lever 18'. While opening 47 has a substantially larger area than that of pin 26, fixed spring end 46 and the circular opening in the other ear of lever 18' will restrict the movements of lever 18' to a substantially true pivotal movement about the axis of pin 26. With this construction, the lever 18' and the cam 16 will be normally biased towards closed position by the spring 37', as shown in Figs. 11 and 12, whenever the lever is released. In the position of cam 16 shown in Fig. 12, such cam will be in engagement with the webbing material of the belt end 12 and will hold such end against any stresses tending to separate such webbing from the buckle. Stresses of this type will cause the cam 16 to rotate further in the direction it is urged by the spring 37' to increase the grip on the belt end 12. To release the webbing 12, it is necessary to lift lever 18' against the tension of spring 37'. Upon release of the lever 18', spring 37' will rotate the same and cam 16 to closed position until the teeth of the cam come into engagement with the grooved portion 30 of the buckle. From the position shown in Fig. 12, the lever 18' may be manually closed further to a position corresponding to that of lever 18 in Fig. 7 of the drawings. This position is shown in Fig. 13, which also shows that the wall defining opening 47 is so configured, that in such position of lever 18' a portion of the edge or wall of the opening 47 which is shaped like a cam, will come into engagement with the spring end 46. In this fully closed position of cam 16 there is thus a solid connection between the ear 34' and the pin 26, which maintains the adjacent end of cam 16 pressed into the webbing 12 with a force substantially equal to that of the other end of cam 16.

Should it be desired to use a belt end 12 provided with a metal end piece 50 (see Figs. 14 to 16) in order to obtain a metal to metal grip between the buckle and belt end, the buckle of the instant invention readily lends itself to this use without substantial modification. As shown in Figs. 14 to 16, the metal end piece is formed to provide a slot or opening 51 through which the belt end 12 is looped, the folded back terminal portion of such end being secured to the body thereof by any suitable means such as rivets, nuts and screws, etc. The outer end of the end piece is provided with a slot or opening 52 adapted to receive a tongue 53 stamped out of the bottom wall of the buckle. The body of a buckle modified for use with a metal end piece 50 is essentially similar in construction to the body previously described and may be deformed to provide a reenforcing rib 15 or left plain at its attached end as shown in Figs. 14 and 15. It is preferred, however, that the body portion or bottom wall thereof be not worked to provide a grooved portion 30 and a ramp 21 as in the embodiment previously described, but that instead such bottom wall be cut and deformed in the area beneath the cam 16' to provide the tongue 53. As shown in Figs. 14 to 16, tongue 53 is centrally located beneath cam 16' and extends inwardly and upwardly a distance approximately the thickness of the material of such tongue so that its end face is just above the inner surface of the bottom wall of the buckle. Thus, when the end piece 50 which is of substantially equal thickness, is latched to tongue 53, the latter will be wholly below the top surface of such end piece.

Shoulders 54 may be provided on the end piece 50 to coact with the side walls 31'', 32'' of the buckle to readily position the opening 52 in proper position to receive the tongue 53. Preferably the teeth 29 of cam 16 are eliminated, so that the outer end of cam 16' provides a smooth cam locking surface which engages the top surface of the end piece, when the lever 18'' is moved to closed position, to lock the end piece upon the tongue 53. The lever and cam arrangement of this embodiment may be similar to the spring pressed arrangements previously described in which case the end piece 50 can be inserted under the cam 16' either while the lever 18'' is in opened position or in closed position. In the latter operation, it will be understood that the spring associated with the lever and cam will yield to permit the same to be accomplished. The lever and cam may also be assembled on the buckle without a spring as shown in Figs. 14 to 16 of the drawings. In a springless construction, it is preferred that the opening 36' for the lug 35' on the lever 18'' be made only slightly wider than the thickness of lug 35' so that the cam 16' is under positive control at all times. The same results can also be accomplished by making the cam 16' and lever 18'' integral.

I claim:

1. A buckle comprising a body having a back plate provided with a transverse opening adjacent to one end thereof and forming on such back plate a transverse end bar to which one end of a belt is connected, side walls extending from said back plate and provided with aligned openings adjacent to the other end of said back plate, a pin extending through said openings, a locking member extending transversely between said side walls and having a longitudinally extending bore revolvably receiving said pin, said member having an offset locking portion coactable with a portion of said back plate located behind said pin to lock said buckle on a belt end inserted between said member and portion, and having an elongated recess extending longitudinally thereof and located on that side of said member which is substantially opposite to the offset locking portion thereof, said recess providing a pair of spaced shoulders extending lengthwise of said member and inwardly of said side thereof, a hand operable lever member disposed generally substantially tangentially to said side of said locking member with one end thereof overlying said recess, said lever end having inturned ears provided with aligned openings for revolvably receiving said pin and located on said pin between the ends of said locking member and said side walls, said lever end having a lug in the form of an integral extension located between said ears and bent inwardly at an angle to said lever so as to extend into said recess, said lug being permanently located in said recess between said shoulders and coacting with at least one of said shoulders when said lever is manually pivoted about said pin to cause said locking member to be rotated as a unit with said lever in the direction of pivotal movement of the latter, a spring seat provided in one end of said locking member, a spring mounted on said pin between said locking member and a lever ear having one end engaged with said spring seat, the other end of said spring extending outwardly in parallelism with said pin through an opening in the associated lever ear and through an opening in the associated side wall of the buckle and being fixed to said associated side wall so that said locking member is normally biased into engagement with said belt end.

2. A buckle as defined in claim 1, in which said other end of the spring rests on said pin, and said lever ear opening forms part of the opening through which said pin extends, said opening having a cam shaped edge portion engaging said spring end when said offset locking portion is in said coactable relation with said back plate portion.

3. A buckle comprising a body having a back plate provided with a transverse opening adjacent to one end thereof and forming on such back plate a transverse end bar to which one end of a belt is connected, side walls extending from said back plate and provided with aligned openings adjacent to the other end of said back plate, a pin extending through said openings, a locking member extending transversely between said side walls and having a longitudinally extending bore revolvably receiving said pin, said member having an offset locking portion coactable with a portion of said back plate located behind said pin to lock said buckle on a belt end inserted between said member and portion, and having an elongated recess extending longitudinally thereof and located on that side of said member which is substantially opposite to the offset locking portion thereof, said recess providing a pair of spaced shoulders extending lengthwise of said member and inwardly of said side thereof, a hand operable lever member disposed generally substantially tangentially to said side of said locking member with one end thereof overlying said recess, said lever end having inturned ears provided with aligned openings for revolvably receiving said pin and located on said pin between the ends of said locking member and said side walls, said lever end having a lug in the form of an integral extension located between said ears and bent inwardly at an angle to said lever so as to extend into said recess, said lug being permanently located in said recess between said shoulders and coacting with at least one of said shoulders when said lever is manually pivoted about said pin to cause said locking member to be rotated as a unit with said lever in the directed of pivotal movement of the latter, a spring mounted on one end of said pin between said locking member and a lever ear, said spring having one end connected to said locking member and the other end connected to an associated side wall of said back plate so that said locking member is normally biased into engagement with said belt end, said spring end connected to said side wall extending through an elongated opening in said lever ear having an area substantially greater than the area of said pin end and extending a substantial distance around said pin to enable said lever member to move about said pin relative to said back plate and to said locking member, said spring end coacting with a wall portion of said elongated recess spaced from and concentric with said pin and to restrict the movements of said lever member to a substantially true pivotal movement about the axis of said pin.

References Cited in the file of this patent

UNITED STATES PATENTS

| | | |
|---|---|---|
| 330,232 | Hall | Nov. 10, 1885 |
| 1,388,623 | Walker | Aug. 23, 1921 |
| 1,517,080 | Lester | Nov. 25, 1924 |
| 1,596,866 | Bobins | Aug. 24, 1926 |
| 2,191,228 | Dowd | Feb. 20, 1940 |
| 2,271,133 | Thoresen | Jan. 27, 1942 |
| 2,517,424 | Griswold | Aug. 1, 1950 |
| 2,816,339 | Prete | Dec. 17, 1957 |

FOREIGN PATENTS

| | | |
|---|---|---|
| 203,943 | Great Britain | Sept. 20, 1923 |
| 212,841 | Great Britain | Mar. 20, 1924 |
| 661,504 | Great Britain | Nov. 21, 1951 |
| 664,741 | Germany | Sept. 3, 1938 |